No. 710,484. Patented Oct. 7, 1902.
D. MACKENZIE.
ROCK DRILL, ROCK DRILLING MACHINE BIT, OR THE LIKE.
(Application filed Feb. 10, 1902.)
(No Model.)
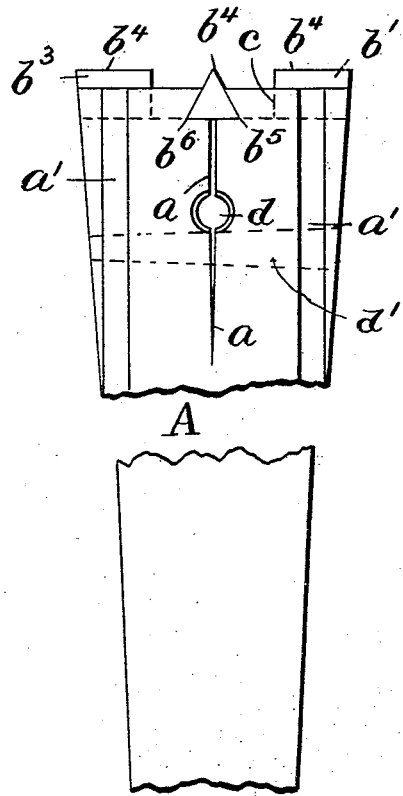
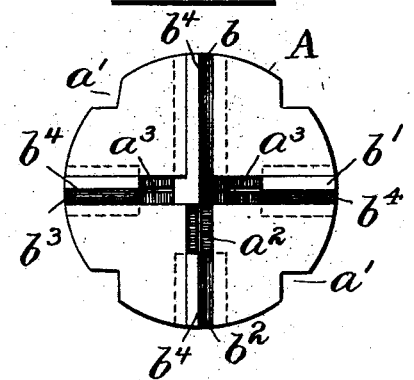
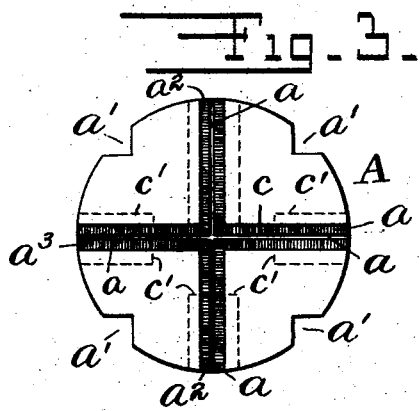
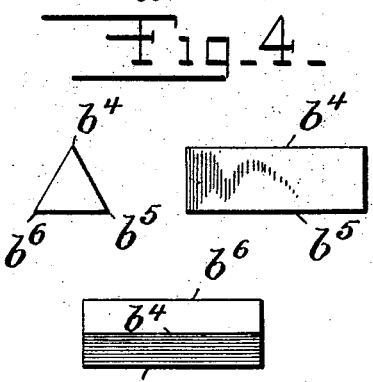
WITNESSES:
J. B. McGirr.
Frank H. Davis
INVENTOR
Donald Mackenzie
per George Haseltine
Attorney.

ns of the cutting edges which fill
UNITED STATES PATENT OFFICE.

DONALD MACKENZIE, OF RANDFONTEIN, NEAR KRUGERSDORP, SOUTH AFRICAN REPUBLIC.

ROCK-DRILL, ROCK-DRILLING-MACHINE BIT, OR THE LIKE.

SPECIFICATION forming part of Letters Patent No. 710,484, dated October 7, 1902.

Application filed February 10, 1902. Serial No. 93,316. (No model.)

*To all whom it may concern:*

Be it known that I, DONALD MACKENZIE, a subject of the King of Great Britain, residing on the property of the Porges Gold Mining Company, Limited, at Randfontein, near Krugersdorp, South African Republic, have invented certain new and useful Improvements in Rock-Drills, Rock-Drilling-Machine Bits, or the Like, of which the following is a specification.

This invention consists of certain improvements which may be utilized in the production or construction of hand rock-drills, known also as "chisel-bits" or "jumpers," to rock-drilling-machine bits, known as "star-bits," "three-winged bits," and to other forms of rock drills or bits or other similar drilling or boring tools or appliances. In working, as is well known, the outer extremities of the cutting edges or drilling-bits wear away much more rapidly than those portions occupying or directed toward the center of the cutting-face of the drill, where the wear is practically *nil*, and in the case of the drills or drilling-bits hereinbefore enumerated more especially when the outer extremities of the cutting edges are worn away it has heretofore necessited the resharpening of the drill or bit or the re-formation of the cutting edges on the face thereof, which repeated operation of resharpening results in a considerable waste or loss of steel in addition to being very expensive.

Now among other objects the present invention is designed to obviate this excessive waste of steel and to dispense with this expensive operation of resharpening. These objects are accomplished by so constructing the drill or drilling-bit as to render the cutting edges which constitute the working face renewable, and, further, so as to permit of the removal and reversal of the cutters or cutting edges—that is to say, to enable those pieces on which the cutting edges are formed to be removed and reversed, so that that part or portion of the cutting edge which occupied or was directed toward the center of the drill will when reversed be located at or form the outer extremity of the cutting edge. By this construction I am able to get considerably more work out of the drill by using the unworn portions of the cutting edges which fill or occupy the center when the outer extremities of the cutting edges are worn away and at the same time effect a great saving in steel. Further, I may provide the detachable cutters or the parts or pieces on which the cutting edges are formed with three separate cutting edges, so that when the first cutting edge has been worn away or destroyed the cutter may be rotated axially and the second edge may be used and thereafter the third edge. I thus provide each cutter with six extremities of the cutting edges, each of which may in turn be located at the outside of the drill.

The invention will be more readily comprehended on reference to the accompanying drawings, in which, by way of example, I illustrate a star-bit constructed in accordance therewith.

In the drawings, Figure 1 is a side elevation of the same. Fig. 2 is a plan view of the working face thereof, showing the several cutters in position in the holder; Fig. 3, a plan view of the working face or end of the holder with the several cutters removed. Fig. 4 shows several views of one of the cutters detached.

The drill comprises a holder or gripper A for the several detachable or removable cutters or the pieces on which the cutting edges are formed. As in the case of an ordinary star-bit, this holder is tapered from the working face toward the shank. As seen more particularly at *a* in Fig. 3 of the drawings, the holder is split through the center in two directions at right angles for a suitable portion of its length, thus providing the holder with four expanding jaws, which act preferably by their natural spring to grip and firmly secure the cutters in position on the cutting-face. In addition the jaws may be bolted or otherwise held together to further secure the cutters.

In the exterior of the holder longitudinal grooves *a'* are formed for a portion of its length to provide clearance or to allow the pulverized material to escape from the cutting-face of the tool and to prevent its jamming.

In that end of the holder A (see Figs. 2 and 3) which forms the working or cutting face are formed two transverse grooves or slots $a^2$ $a^3$ at right angles to each other and passing through the center, where they intersect at right angles to the axis of the holder. These grooves are in line with or in the same plane as the slits $a$ of the holder and are provided to receive the several detachable cutters or pieces $b\ b'\ b^2\ b^3$, on which the cutting edges are formed.

The several cutters (see Fig. 4) are preferably of equilateral triangular section, thereby enabling them to be fitted in the holder in any of six alternative positions, three by axial rotation for each extremity of the cutter. These cutters may be provided with three cutting edges $b^4\ b^5\ b^6$, or, if preferred, one edge only may be used as a cutting edge, and after it has been reversed and worn at each end it may be removed and replaced by a fresh cutter.

In the construction and arrangement shown in Figs. 1 and 2 the cutters vary in length. The cutter $b$ is longer than the other three cutters $b'\ b^2\ b^3$, and the cutting edge formed thereon extends slightly beyond the center of the drill, while the cutting edges on the cutters $b'\ b^2\ b^3$ terminate at a point approximately midway between the periphery and the center of the working face.

The grooves $a^2\ a^3$, in which the several cutters are fitted, are, as is clearly indicated in connection with the cutter $b^2$ in Fig. 1, of angular or dovetail formation, corresponding to the base of the cutters. The cutting edges project through or beyond the grooves $a^2\ a^3$ to the working face of the drill or holder. In the case of the cutter $b$, Fig. 2, the groove is of dovetail form to the center of the holder; but in the case of each of the other three cutters $b'\ b^2\ b^3$ the dovetail groove terminates at the point $c$, and the continuation of the groove in the direction of the center of the drill is of U shape, thereby forming projections or shoulders at $c'$, against which the inner ends of the triangular cutters abut when in position. In place of this construction the dovetail grooves may be continued entirely across the face of the holder, stops or other suitable means being employed for retaining the shorter cutters in the desired position in the grooves. The several cutters may be made of any desired length, their outer ends standing at the periphery of the holder, while the cutting edges may terminate at any intermediate point. The cutter $b$ might be continued right across the face of the holder and the separate cutter $b^2$ be done away with, or the several cutters may be all continued and meet at the center of the drill, similar to the cutting edges on an ordinary star-bit. The grooves provided in the holder for the cutters need not necessarily be of dovetail shape, as shown, but they may assume other shapes so long as they are adapted to retain the bases of the cutters in position, the cutters being correspondingly fashioned to fit the grooves.

To facilitate the insertion and withdrawal of the cutters, I form in the slit or split portion of the holder two taper holes $d\ d'$, in which taper pins or keys may be driven to expand the jaws to release their grip of the cutters for the removal of the cutters either to reverse or renew them. The taper holes $d\ d'$ are formed through the holder a short distance apart, as shown, to enable the holder to be expanded in both directions at the same time. In lieu of this method, which, however, I prefer as being the most practical, a punch or other device may be used and placed in the grooves $a^2\ a^3$ behind the inner ends of the cutters to drive them out of the holder.

The application of my invention to the several other forms of drills specified will be readily understood from the foregoing description. According as the drill or bit may have one, two, three, or more cutting edges the principle and mode of construction will be the same.

What I claim as my invention, and desire to protect by Letters Patent, is—

1. In combination, the holder A, split longitudinally through the center in two directions at right angles forming jaws for a portion of its length, the taper holes $d$ and $d'$ through the splits, the taper plugs in such holes for expanding the split portion, the dovetailed grooves $a^2\ a^3$ in the end of the holder coinciding with the mouth of the splits, and triangular cutters removably held in said grooves by the normal inward spring of the jaws.

2. In combination, the holder A, split longitudinally through the center in two directions at right angles forming jaws for a portion of its length, the taper holes $d$ and $d'$ for expanding the split portion, the longitudinal grooves $a'$ formed in the exterior, the dovetailed grooves $a^2\ a^3$ in the end of the holder coinciding with the mouth of the splits, and triangular cutters removably held in said grooves by the normal inward spring of the jaws.

3. A rock-drill, rock-drilling-machine bit, or like drilling or boring tool or appliance, consisting of a holder constructed with radial grooves or slots in the working face at right angles to its axis, certain of the grooves being angular from the periphery of the holder for a distance inward and smaller and U-shaped from that point to the center, and correspondingly-shaped angular cutters constructed and fitted in said grooves so as to be capable of being removed and replaced so as to axially rotate and end for end reverse the cutting edges, substantially as and for the purposes set forth.

4. In a rock-drill or rock-drilling-machine bit, the combination of holder provided with dovetail grooves or slots in the end thereof extending radially inward for varying lengths, said holder being split for a portion of its length on lines intersecting the bases of said grooves, and cutters removably clamped in said dovetail grooves and constructed so that they may be rotated axially or reversed when the outer extremities of the cutting edges become worn, substantially as set forth.

5. In a rock-drill, or rock-drilling-machine bit, the combination of a holder formed with grooves or recesses across the end thereof made angular for a portion of their length to receive removable cutters and having shoulders against which the inner ends of the cutters abut, said holder being also split for a portion of its length in two directions into jaws which normally grip the cutters but may be expanded, and detachable angular cutters adapted to fit said grooves and provided with several separate cutting edges and so constructed and arranged in the holder as to be capable of being removed and replaced to reverse each of the several cutting edges, substantially as described.

6. In rock-drills or rock-drilling-machine bits, the combination with a holder provided with radial triangular or dovetail grooves in the end thereof, and split for a portion of its length into jaws to permit of the removal and renewal of the cutters and to act by their normal inward spring to secure the same in position in the grooves, of equilateral triangular cutters provided with three separate cutting edges and reversible in the holder so that the two extremities of each of the three cutting edges may in turn be located at the outside of the drill, and stops located within the grooves for holding the outer ends of the cutters flush with the periphery of the holder, substantially as and for the purpose specified.

7. In a rock-drill or rock-drilling-machine bit, in combination, a holder split for a portion of its length in two directions into four jaws which spring normally inward, means for independently expanding the pair of jaws of either split portion to release and reverse or replace the cutters, dovetail grooves formed in the end of the holder, and cutters of varying length and of equilateral triangular section provided with three separate cutting edges each capable of being reversed in the holder, substantially as shown and described.

8. In combination, the holder A, split longitudinally through the center in two directions at right angles for a portion of its length, the taper holes $d$ and $d'$ for expanding the split portion, the longitudinal grooves $a'$ formed in the exterior, the grooves $a^2$ and $a^3$, the cutter $b$ projecting to the center of the drill, and provided with three cutting edges, and the cutters $b'$ $b^2$ $b^3$ terminating at an intermediate point, and provided with three cutting edges, substantially as described and shown in the drawings.

In witness whereof I have hereunto set my hand in the presence of two subscribing witnesses.

DONALD MACKENZIE.

Witnesses:
 I. T. LEA,
 JAS. D. RANDALL.